United States Patent [19]

Gibson

[11] Patent Number: 5,257,728
[45] Date of Patent: Nov. 2, 1993

[54] METHOD AND APPARATUS FOR TRANSPORTING A PERSONAL WATERCRAFT ON A TRUCK BED

[76] Inventor: Terry L. Gibson, 2107 South Recker Rd., Higley, Ariz. 85236

[21] Appl. No.: 848,345

[22] Filed: Mar. 9, 1992

[51] Int. Cl.⁵ .............................................. B60R 9/08
[52] U.S. Cl. ...................... 224/42.45 R; 224/321; 224/324; 224/325
[58] Field of Search ............... 224/273, 309, 310, 317, 224/320, 321, 324, 325, 42.42, 42.45 R; 296/3, 37.6, 37.1, 37.7; 410/2, 77, 80, 87; 414/462; 280/656, 414.1; 114/259, 344; 248/354.5, 671

[56] References Cited

U.S. PATENT DOCUMENTS

| | | | |
|---|---|---|---|
| 3,204,910 | 9/1965 | Gacher | 248/354.5 X |
| 3,610,431 | 10/1971 | Rodder | 211/176 |
| 3,972,433 | 8/1976 | Reed | 224/310 X |
| 4,211,448 | 7/1980 | Weston | 224/325 X |
| 4,241,858 | 12/1980 | Lawroski | 224/42.03 R X |
| 4,369,902 | 1/1983 | Lampeas | 224/42.42 |
| 4,437,597 | 3/1984 | Doyle | 224/42.45 |
| 4,469,257 | 9/1984 | Parker | 224/42.45 |
| 4,630,990 | 12/1986 | Whiting | 224/310 X |
| 4,863,082 | 9/1989 | Evans et al. | 224/42.45 |
| 4,867,497 | 9/1989 | Jayne | 224/42.45 R X |
| 4,989,768 | 2/1991 | McNulty | 224/42.45 |
| 5,005,846 | 4/1991 | Taylor | 410/2 X |
| 5,037,019 | 8/1991 | Sokn | 224/42.45 |
| 5,058,946 | 10/1991 | Faber | 280/414.1 X |

Primary Examiner—Henry J. Recla
Assistant Examiner—Glenn T. Barrett
Attorney, Agent, or Firm—Antonio R. Durando; Harry M. Weiss

[57] ABSTRACT

The preferred embodiment consists of a rack comprising two separate parts, a nose piece and a tail piece, mounted in the pockets of either side wall of the bed of a pick-up truck. The nose piece consists of an adjustable, substantially horizontal, support plate with a protruding stud and nut for receiving and securing in place the nose of a personal watercraft. The plate of the nose piece is attached to the end of an extendable shaft mounted in the front pocket of the side wall of the truck, so that the height of the plate can be adjusted to fit the size and profile of the watercraft being carried. The tail piece consists of a similar shaft, mounted in the rear pocket of the same side wall, incorporating a cross member at its top end having a cradle-like concave upper face, preferably shaped like the underside of the watercraft, so as to provide a conforming support bracket for the watercraft. Depending on the specific type of watercraft and the corresponding shape of the support bracket of the tail piece, it may be necessary to fasten the watercraft to the rack during transport. In another embodiment of the invention designed for use without utilizing the truck's side wall pockets, mounting frames are also provided for securing the rack to the bed of the truck.

14 Claims, 2 Drawing Sheets

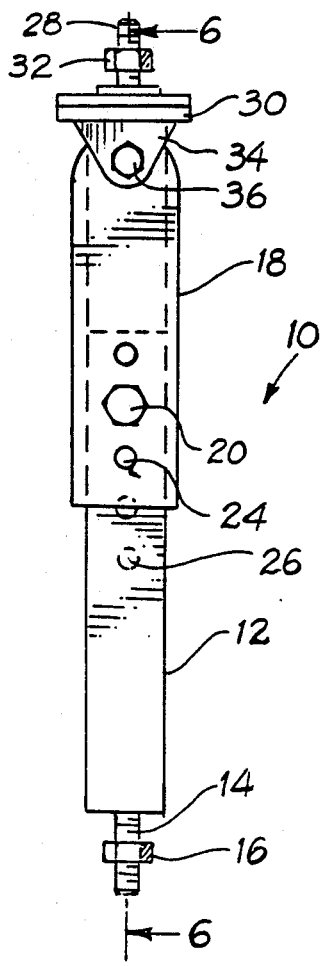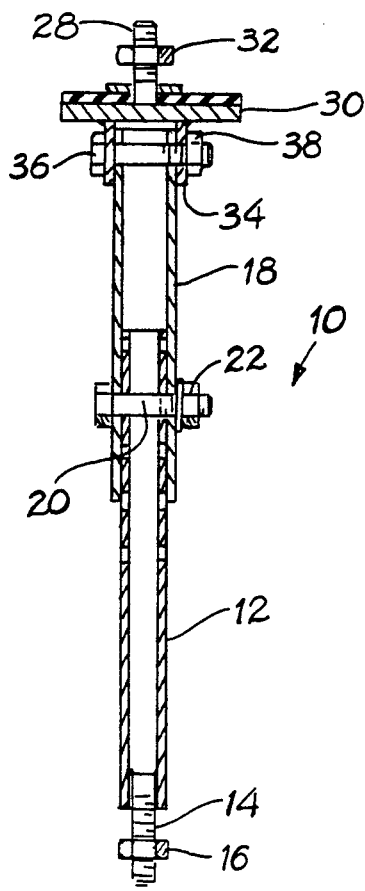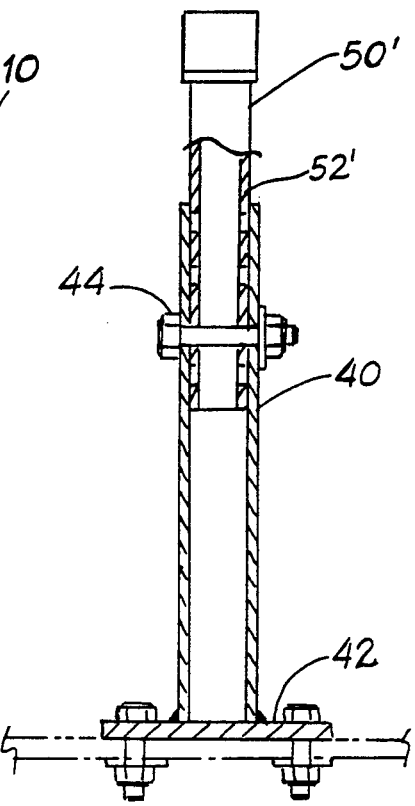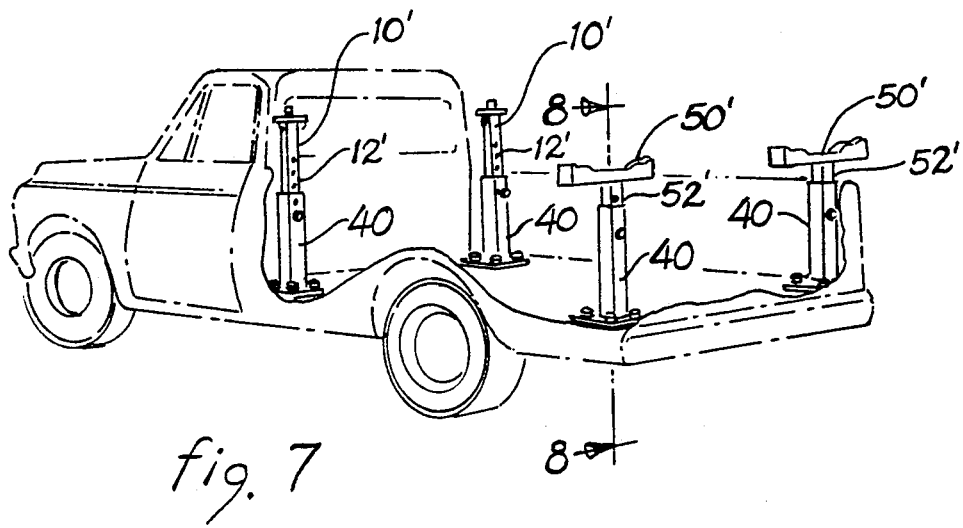

METHOD AND APPARATUS FOR TRANSPORTING A PERSONAL WATERCRAFT ON A TRUCK BED

BACKGROUND OF THE INVENTION

1. Field of the Invention

This invention is related to the general field of automotive accessory equipment. In particular, the invention provides a method and apparatus for carrying a personal watercraft on the bed of a standard pick-up or flat-bed truck.

2. Description of the Prior Art

Personal watercrafts have become very popular in recent years as substitutes for water skiing because they are less expensive, and easier to transport and store than regular boats. Normally, they are transported in trailers dedicated to them, in the same fashion as motorcycles and snowmobiles, which increases the cost of owning and operating them. The purpose of this invention is to provide an apparatus that makes it possible to load one or more personal watercrafts on the bed of a truck and safely transport them to destination, thus avoiding the cost involved with owning and maintaining a dedicated trailer.

Several patents exist that describe accessory equipment for carrying various objects on trucks and trailers. For example, U.S. Pat. No. 4,469,257 to Parker (1984) illustrates a rack for mounting snow skis on the bed of a pick-up truck; and U.S. Pat. No. 4,863,082 to Evans et al. (1989) discloses a water ski rack for either truck, car or boat use. In U.S. Pat. No. 4,369,902 (1983), Lampeas shows a retractable, general purpose, load carrier for vehicles; and Rodder, in U.S. Pat. No. 3,610,431 (1971), describes another general purpose rack that can be used for hauling equipment in a trailer or a truck. U.S. Pat. No. 4,437,597 (1984) to Doyle and U.S. Pat. No. 5,037,019 (1991) to Sokn describe specialized racks for motorcycles and bicycles, respectively; while U.S. Pat. No. 3,972,433 (1976) to Reed and U.S. Pat. No. 4,989,768 (1991) to McNulty illustrate multipurpose apparatus for loading various kinds of equipment on the bed of pick-ups.

Nothing in the referenced patents teaches an apparatus that can be used for handily and safely loading and transporting a personal watercraft on a truck. Therefore, this invention is directed at providing such an apparatus, particularly with a view to the class of watercrafts sold by Kawasaki Motors Corporation under the trademark "Jet Ski."

BRIEF SUMMARY OF THE INVENTION

One objective of this invention is the development of simple apparatus that can be attached to the bed of a pick-up or flat-bed truck to provide a rack for personal watercrafts to be used in substitution of a dedicated trailer.

Another objective of the invention is a rack system that can be installed on and removed from the bed of the truck easily and quickly, as an accessory, so as to provide a convenient way to haul a watercraft.

A further goal of the invention is a rack system that does not diminish the space in the truck bed available for normal loading.

Still another objective of the invention is an apparatus that does not interfere with the view of the driver of the vehicle on which it is mounted.

A final objective of this invention is the realization of the above mentioned goals in an economical and commercially viable manner. This is done by utilizing components and methods of manufacture that are either already available in the open market or can be developed at competitive prices.

According to these and other objectives, the preferred embodiment of the present invention consists of a rack comprising two separate parts, a nose piece and a tail piece, mounted in the pockets of either side wall of the bed of a pick-up truck. The nose piece consists of an adjustable, substantially horizontal, support plate with a protruding stud and nut for receiving and securing in place the nose of a personal watercraft. The plate of the nose piece is attached to the end of an extendable shaft mounted in the front pocket of the side wall of the truck, so that the height of the plate can be adjusted to fit the size and profile of the watercraft being carried. The tail piece consists of a similar shaft, mounted in the rear pocket of the same side wall, incorporating a cross member at its top end having a cradle-like concave upper face, preferably shaped like the underside of the watercraft, so as to provide a conforming support bracket for the watercraft. Depending on the specific type of watercraft and the corresponding shape of the support bracket of the tail piece, it may be necessary to fasten the watercraft to the rack during transport. In another embodiment of the invention designed for use without utilizing the truck's side wall pockets, mounting frames are also provided for securing the rack to the bed of the truck.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 5 is a side elevational view of the preferred embodiment of the nose piece of the invention.

FIG. 6 is an elevational view taken from line 6—6 in FIG. 5.

FIG. 7 is a perspective view of another embodiment of the apparatus of this invention mounted on the bed of a pick-up truck, wherein the side and back walls are shown partially cut out.

FIG. 8 is a partially cut-out elevational view of the tail piece including the support frame of the embodiment shown in FIG. 7 taken from line 8—8 in that figure.

DETAILED DESCRIPTION OF THE INVENTION

Figure 1:
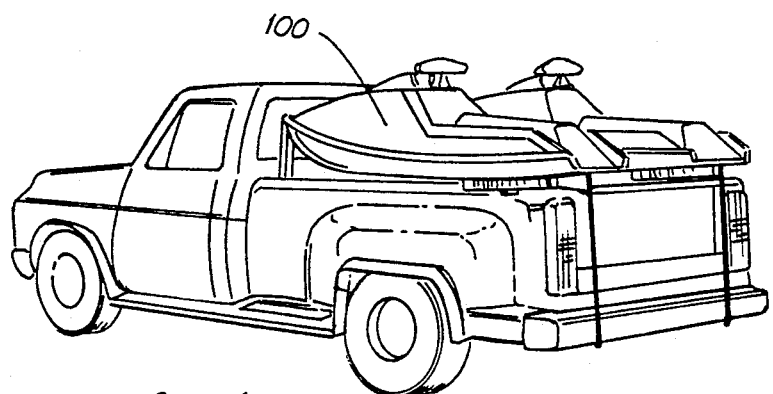
FIG. 1 is a perspective view of a typical pick-up truck carrying two personal watercrafts mounted on the preferred embodiment of the apparatus of this invention.

The thrust of this invention lies in the design of two brackets specifically suited for mounting a personal watercraft, particularly a Jet Ski ®, on the bed of a typical pick-up or flat-bed truck. As illustrated in FIG. 1, the invention provides a watercraft rack that enables a user to load one watercraft on each of the two side walls of the truck, leaving the bed almost entirely available for normal use.

Figure 2:
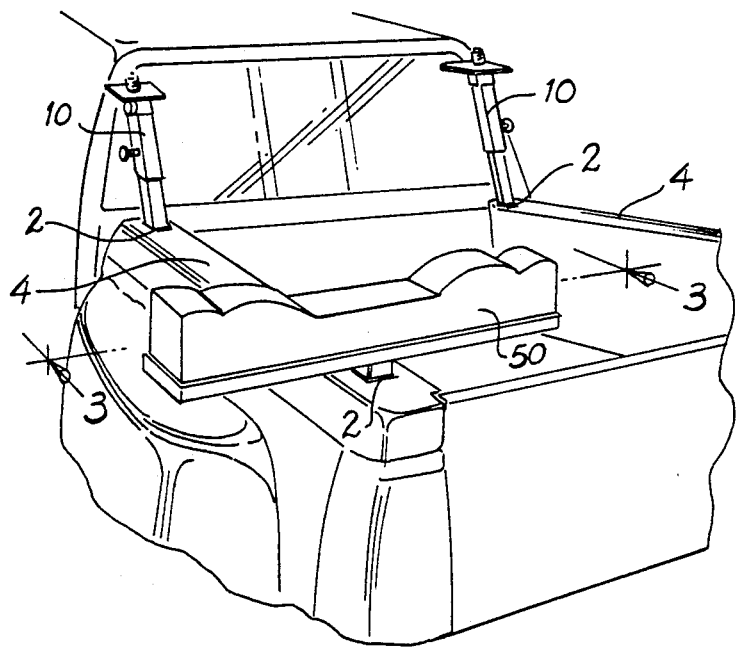
FIG. 2 is a perspective partial view taken from the back of a typical pick-up truck showing the nose and tail pieces of the preferred embodiment of the invention mounted in the pockets of the side walls of the truck.
Figure 3:
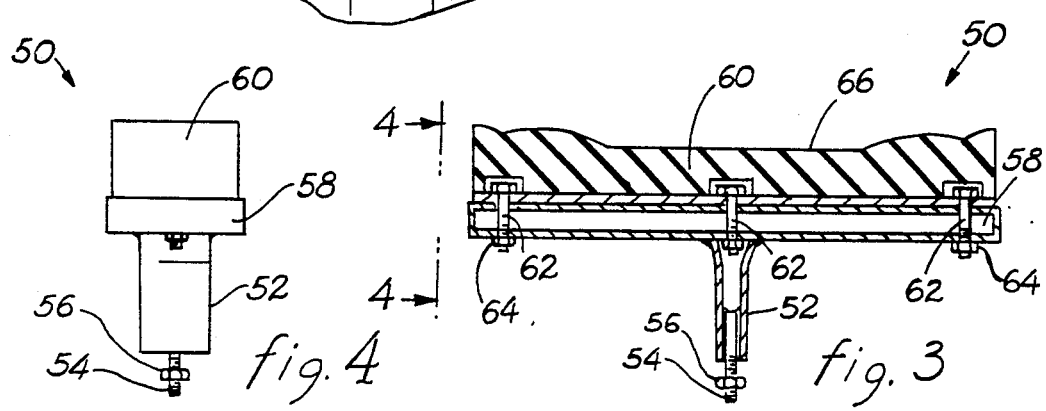
FIG. 3 is a cross-sectional elevational view of the preferred embodiment of the tail piece of the invention taken from line 3—3 in FIG. 2.
Figure 4:
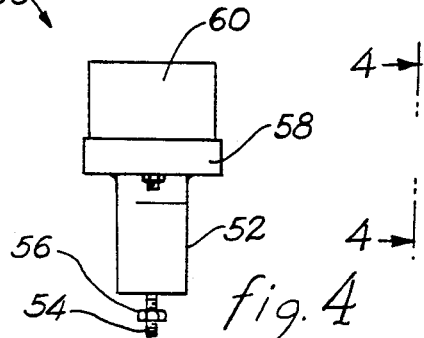
FIG. 4 is a side elevational view taken from line 4—4 in FIG. 3.

Referring to the drawings in FIGS. 2-8, wherein like parts are identified with like numerals throughout this specification, FIG. 2 illustrates the way the nose piece 10 and the tail piece 50 of the preferred embodiment of the invention are mounted in the front and rear pockets 2 of the side walls 4 of a typical pick-up truck. As apparent from the geometry of the lower portion of the tail piece illustrated in FIGS. 3 and 4, that show a cross-sectional front view and a side view of the tail piece 50, which is designed to fit snugly into each pocket, the side wall pockets 2 have a rectangular cross section and are sufficiently deep to receive and hold securely in place in an upright position a vertical beam inserted into it. Typically, each pocket is 2 inches long, 1 and ⅝ inches wide, and 6 inches deep. Accordingly, the bottom portion of the tail piece 50 consists of a vertical shaft 52 of the same approximate length as the depth of the pocket 2 and with a substantially rectangular cross section slightly smaller than that of the pocket, so that the shaft 52 may be inserted to fit snugly into the pocket. Obviously, a shaft with a different cross-section would be used if the pocket were not rectangular, the important feature being that the shape of the two conform for a good fit. A threaded bottom stud 54, attached to the bottom end of the shaft 52, protrudes downward to provide a means by which the tail piece 50 may be anchored to the bottom of the pocket 2 in the side wall 4 of the truck. If necessary, a matching hole may need to be drilled in the bottom wall of each pocket to receive the stud 54, so that it can then be secured by a threaded nut 56 mounted on the other side of that wall.

The top end of the shaft 52 is firmly attached to a horizontal cross member 58 which provides a bracket for supporting the back portion of a personal motorcraft 100 (shown in FIG. 1) laid on top of it. The cross member 58 is illustrated in the drawings as consisting of a rectangular beam attached, as by welding, to the top end of the shaft 52, but any equivalent cross beam affixed to the bottom shaft in T-shaped configuration would be adequate to practice the invention. The top of the cross member 58 is covered with a bracket cap 60 shaped to conform to the underside of the watercraft, so as to provide a framework for cradling the bottom of the watercraft mounted on it. The bracket cap is illustrated in the drawings as being anchored to the cross member 58 by means of bolts 62 threaded through apposite vertical openings in the cross member and kept in place by nuts 64 tightened against the bottom of the cross member. The cap could equivalently be designed to snap onto the cross member 58, or to be an integral part thereof, or to be attached to it by any other means that would be known to one skilled in the art. The important feature is that the top side 66 of the cap, or of the cross member in the case when the cap is incorporated into it, be shaped so as to form a concave surface able to cradle the bottom of a watercraft or, preferably, be shaped to conform to its bottom. While not essential to the invention, the top side 66 of the support cradle so formed should be made or covered with non-abrasive resilient material, such as plastic, wood or rubber, in order to avoid damage to the bottom of the craft during transport.

FIGS. 5 and 6 show the nose piece 10 of the preferred embodiment of the invention in side and cross-sectional front view, respectively. The bottom portion of the nose piece 10 consists of a vertical lower shaft 12 shaped like the tail piece's bottom shaft 52 for a snug fit into the front pocket 2 in the side wall of the truck, which typically features two or three identical pockets. The lower shaft 12 is also equipped with a protruding threaded stud 14 and a nut 16 for fastening to the bottom wall of the pocket 2. The length of the shaft 12 must be sufficient to fill the pocket in which it is inserted and to provide a vertical anchor over which the upper shaft 18 of the nose piece can be slidably mounted as a sleeve and extended telescopically for height adjustment. It is found that a lower shaft protruding approximately one foot from the side-wall pocket is appropriate to accommodate the height requirements of the different profiles of various watercrafts currently on the market. Obviously, the upper shaft 18 has a cross section sufficiently larger than that of the lower shaft 12 to be able to slide over it telescopically and be coupled with it to form a continuous and adjustable beam. The two shafts are coupled by means of a removable peg or bolt 20 inserted through matching peg holes 24 and 26 in the upper and lower shafts 12 and 18, respectively, and secured in place by a nut 22 or equivalent stopping means. By virtue of providing a multiplicity of peg holes in both shafts, the height of the nose piece can be adjusted as needed.

A support plate 30, containing a stud 28 protruding upwards from it, is pivotally mounted on the top end of the upper shaft 18 through a pair of flanges 34 affixed to the bottom of the plate and hinged to the upper shaft by a lateral bolt 36 secured by a nut 38. The plate is so hinged that it can lean backwards or forward from a substantially horizontal position to conform to the slope of, and provide a support bracket for, the nose of the watercraft loaded on the tail piece. In order to secure the nose of the watercraft in position on the support plate 30, the stud 28 is provided for insertion through the tow hole typically found in the nose of the watercraft, where it can be bolted in place with the nut 32 or with any other equivalent tying device.

Thus, in operation, the rack of this invention is utilized by mounting a nose piece in the front pocket and a tail piece in the rear pocket of the side wall of a pick-up truck. A personal watercraft, such as a Jet Ski ®, is then lifted and laid on the cradle formed by the cross member of the tail piece and pulled forward to meet the support plate in the nose piece, where the tow hole is firmly fastened to the plate through the stud protruding from it. In the case of Jet Skis, the plate in the nose piece is tilted slightly backwards in order to facilitate the coupling with the stud.

FIGS. 7 and 8 illustrate a different embodiment of the invention designed for flat-bed trucks or for trucks without pockets in the bed's side walls. As seen in the figures, vertical support sleeves 40 are provided to create frames anchored to the bed of the truck through bottom plates 42 bolted to the bed. In essence, each sleeve 40 serves as a pocket for receiving the nose and tail pieces described above. Rather than being anchored to the bottom wall of each pocket through studs such as 54 and 14 in the preferred embodiment, the nose and tail pieces 10' and 50' of this embodiment are fastened to the sleeves 40 by means of a lateral peg or bolt 44 inserted through apposite peg holes in the sleeve and in the shafts 12 and 52 of each piece. FIG. 8 illustrates a tail piece 50' mounted on the sleeve 40 of the second embodiment of the invention.

For purposes of economical construction of the various parts of this invention, the use of angle iron, aluminum or common steel, in conjunction with protective plastic material, is particularly suited because of the ease with which it can be cut, machined and welded. Nevertheless, any material sufficiently strong to withstand the stresses imparted by the weight of a watercraft during transport is acceptable to practice the invention.

Various other changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

What I claim is:

1. A rack for mounting and transporting a personal watercraft on a bed of a truck having a side wall with a front pocket and a rear pocket, comprising the following components:
   a nose piece consisting of a lower shaft capable of being inserted into the front pocket in the side wall to fit snugly in an upright position, an upper shaft having a top end and a bottom end slidably mounted on said lower shaft and capable of telescopic extension for height adjustment, coupling means for adjustably connecting said lower and upper shafts, and a support plate mounted on the top end of said upper shaft and containing means for securing a nose of the watercraft in place after loading on the rack; wherein said support plate mounted on the top end of said upper shaft is pivotally mounted through a pair of flanges affixed to a bottom side of said plate and hinged to the upper shaft so that said plate can lean backwards or forward from a substantially horizontal position to conform to a slope of, and provide support for, the nose of the watercraft loaded on the rack; and
   a tail piece consisting of a bottom shaft capable of being inserted into the rear pocket of the side wall to fit snugly in an upright position, a horizontal cross member fixedly attached to said bottom shaft and providing a substantially horizontal bracket for supporting a bottom of a back portion of the personal watercraft.

2. The rack described in claim 1, wherein said pair of flanges affixed to the bottom side of said plate are hinged to said upper shaft by means of a lateral bolt secured by a nut.

3. The rack described in claim 1, further comprising a stud protruding upwards from said plate, said stud being provided for insertion through a tow hole in the nose of the watercraft, and comprising means for attaching the nose of the watercraft to said stud.

4. The rack described in claim 1, further comprising a threaded bottom stud, attached to the bottom ends of said lower shaft of the nose piece and said bottom shaft of the tail piece, protruding downward to provide a means by which said shafts may be anchored to the pockets in the side wall of the truck.

5. The rack described in claim 1, wherein said lower shaft of the nose piece and said bottom shaft of the tail piece have a substantially rectangular cross section slightly smaller than that of the pockets in the side wall of the truck, so that said shafts may be inserted to fit snugly into the pockets, and wherein said upper shaft of the nose piece also has a substantially rectangular cross section sufficiently larger than that of said lower shaft to be able to slide over it and be coupled with it to form a continuous and telescopically adjustable beam.

6. The rack described in claim 1, wherein said coupling means for connecting said lower and upper shafts consists of a removable peg inserted through matching peg holes in said upper and lower shafts and secured in place by stopping means.

7. The rack described in claim 6, wherein said coupling means for adjustably connecting said lower and upper shafts further consists of a multiplicity of peg holes in both shafts.

8. The rack described in claim 1, wherein said horizontal cross member fixedly attached to said bottom shaft and providing a substantially horizontal bracket for supporting the back portion of the personal watercraft has a concave top surface.

9. The rack described in claim 1, wherein said horizontal cross member fixedly attached to said bottom shaft and providing a substantially horizontal bracket for supporting the back portion of the personal watercraft has a top surface conforming to the bottom of the back portion of the watercraft, so as to provide a framework for cradling the watercraft.

10. The rack described in claim 1, wherein said horizontal cross member consists of a rectangular beam fixedly attached to a top end of said bottom shaft in T-shaped configuration, and wherein a top of said cross member is covered with a bracket cap shaped to conform to the bottom of the back portion of the watercraft, so as to provide a framework for cradling the watercraft.

11. The rack described in claim 1, wherein said horizontal cross member is covered with non-abrasive resilient material in order to avoid damage to the bottom of the back portion of the watercraft during transport.

12. The rack described in claim 1, further comprising vertical support sleeves anchored to the bed of the truck and capable of receiving and holding in place said lower shaft of the nose piece and said bottom shaft of the tail piece, wherein said shafts are fastened to said sleeves by means of a removable peg inserted through matching peg holes in said sleeve and shafts and secured in place by stopping means.

13. The rack described in claim 12, wherein said lower shaft of the nose piece and said bottom shaft of the tail piece have a substantially rectangular cross section; wherein each of said vertical support sleeves has a substantially rectangular cross section sufficiently larger than that of said lower and bottom shafts to be able to slide over and be coupled with said shafts, so that said shafts may be inserted to fit snugly into said sleeves; and wherein said upper shaft of the nose piece also has a substantially rectangular cross section sufficiently larger than that of said lower shaft to be able to slide over it and be coupled with it to form a continuous and telescopically adjustably beam.

14. A method for mounting and transporting a personal watercraft on a bed of a truck having a side wall with a front pocket and a rear pocket, comprising the following steps:
   (a) providing a nose piece consisting of a lower shaft capable of being inserted into the front pocket in the side wall to fit snugly in an upright position, an upper shaft having a top end and a bottom end slidably mounted on said lower shaft and capable of telescopic extension for height adjustment, coupling means for adjustably connecting said lower and upper shafts, and a support plate mounted on the top end of said upper shaft and containing means for securing a nose of the watercraft in place;
   (b) providing a tail piece consisting of a bottom shaft capable of being inserted into the rear pocket of the side wall to fit snugly in an upright position, a horizontal cross member fixedly attached to said bottom shaft and providing a substantially horizontal bracket for supporting a back portion of the personal motorcraft;
   (c) inserting the lower shaft of the nose piece into the front pocket of the side wall of the truck and inserting the bottom shaft of the tail piece into the rear pocket of the side wall of the truck;
   (d) positioning the watercraft over the horizontal cross member of the tail piece and sliding it forward so that the watercraft's nose rests on the plate of the nose piece; and
   (e) fastening the nose of the watercraft to the nose piece to keep it in place during transport.

* * * * *